US009684343B2

(12) United States Patent
Tazbaz

(10) Patent No.: US 9,684,343 B2
(45) Date of Patent: Jun. 20, 2017

(54) RADIUS HINGE

(71) Applicant: Microsoft Corporation, Redmond, WA (US)

(72) Inventor: Errol M. Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/303,537

(22) Filed: Jun. 12, 2014

(65) Prior Publication Data

US 2015/0362956 A1    Dec. 17, 2015

(51) Int. Cl.

| | |
|---|---|
| *E05D 3/06* | (2006.01) |
| *E05D 3/12* | (2006.01) |
| *G06F 1/16* | (2006.01) |
| *E05D 3/16* | (2006.01) |
| *E05D 3/14* | (2006.01) |

(52) U.S. Cl.
CPC .......... *G06F 1/1681* (2013.01); *G06F 1/1618* (2013.01); *G06F 1/1637* (2013.01); *E05D 3/06* (2013.01); *E05D 3/12* (2013.01); *E05D 3/122* (2013.01); *E05D 3/14* (2013.01); *E05D 3/16* (2013.01)

(58) Field of Classification Search
CPC ....... G06F 1/1681; G06F 1/1618; E05D 3/06; E05D 3/12; E05D 3/122; E05D 3/14; E05D 3/16; Y10T 16/541; Y10T 16/547; Y10T 16/5474; Y10T 16/5475; Y10T 16/5476

See application file for complete search history.

(56) References Cited

U.S. PATENT DOCUMENTS

| | | | | |
|---|---|---|---|---|
| 2,135,280 | A | * 11/1938 | Erickson | ................... E05D 3/16 16/369 |
| 2,200,142 | A | * 5/1940 | Witschi | ..................... E05D 3/16 16/369 |
| 2,206,739 | A | * 7/1940 | Brogren | .................... E05D 3/06 16/354 |
| 3,422,487 | A | * 1/1969 | Dickinson | ................ E05D 3/06 16/273 |

(Continued)

FOREIGN PATENT DOCUMENTS

| | | |
|---|---|---|
| EP | 2546721 A2 | 1/2013 |
| GB | 2080407 A * 2/1982 | ............. E05D 3/127 |

(Continued)

OTHER PUBLICATIONS

International Search Report and Written Opinion mailed Aug. 28, 2015 from PCT Patent Application No. PCT/US2015/034611, 12 Pages.

(Continued)

*Primary Examiner* — Jeffrey O Brien
(74) *Attorney, Agent, or Firm* — Rainier Patents, P.S.

(57) ABSTRACT

The description relates to devices, such as computing devices that have hinged portions. One example can include a display portion that includes a display screen and an input portion that includes an input device. This example can also include a radius hinge assembly rotatably securing the first and second portions. The radius hinge assembly can be configured to provide a curvilinear articulation that allows 360 degrees of relative rotation between the first and second portions.

20 Claims, 8 Drawing Sheets

(56) References Cited

U.S. PATENT DOCUMENTS

| | | | | |
|---|---|---|---|---|
| 3,483,588 A * | 12/1969 | Hover | B63B 19/19 | 16/354 |
| 4,599,998 A * | 7/1986 | Castillo | A61F 5/0123 | 16/354 |
| 4,610,560 A * | 9/1986 | Miller | A47F 5/105 | 16/366 |
| 4,825,395 A * | 4/1989 | Kinser, Jr. | H01H 13/702 | 16/366 |
| 5,363,089 A * | 11/1994 | Goldenberg | G08B 3/1058 | 16/342 |
| 5,570,971 A * | 11/1996 | Rixen | E04B 2/7427 | 16/354 |
| 5,987,704 A * | 11/1999 | Tang | G06F 1/1681 | 16/342 |
| 6,223,393 B1 * | 5/2001 | Knopf | G06F 1/1681 | 16/366 |
| 6,754,081 B2 | 6/2004 | Rude et al. | | |
| 7,042,711 B2 | 5/2006 | Tanaka et al. | | |
| 7,197,790 B1 * | 4/2007 | Edmondson | E05D 3/16 | 16/286 |
| 7,345,872 B2 * | 3/2008 | Wang | G06F 1/1618 | 16/354 |
| 7,714,801 B2 | 5/2010 | Kimmel | | |
| 7,730,587 B2 | 6/2010 | Chang et al. | | |
| 7,765,644 B2 * | 8/2010 | Ueyama | G06F 1/1616 | 16/354 |
| 8,229,522 B2 | 7/2012 | Kim et al. | | |
| 8,438,702 B2 | 5/2013 | Apgar et al. | | |
| 8,477,464 B2 | 7/2013 | Visser et al. | | |
| 8,562,236 B2 * | 10/2013 | Eikelenboom | B64G 1/222 | 16/221 |
| 8,578,561 B2 * | 11/2013 | Chuang | G06F 1/1681 | 16/354 |
| 8,627,546 B2 * | 1/2014 | Zhang | G06F 1/1681 | 16/366 |
| 8,720,011 B1 * | 5/2014 | Hsu | E05D 3/122 | 16/354 |
| 8,869,353 B2 * | 10/2014 | Hsu | E05D 3/14 | 16/364 |
| 2003/0112588 A1 | 6/2003 | Shimano | | |
| 2004/0134034 A1 * | 7/2004 | Baer | E05D 3/122 | 16/354 |
| 2005/0155182 A1 | 7/2005 | Han et al. | | |
| 2006/0236505 A1 * | 10/2006 | Maatta | G06F 1/1681 | 16/366 |
| 2006/0238968 A1 | 10/2006 | Maatta et al. | | |
| 2007/0226955 A1 * | 10/2007 | Cho | E05D 3/122 | 16/354 |
| 2007/0234521 A1 * | 10/2007 | Komppa | G06F 1/1616 | 16/366 |
| 2008/0109995 A1 * | 5/2008 | Kuwajima | H04M 1/022 | 16/354 |
| 2008/0216288 A1 * | 9/2008 | Hoffman | E05D 3/127 | 16/354 |
| 2008/0284295 A1 * | 11/2008 | Lai | G06F 1/1618 | 312/223.2 |
| 2009/0000062 A1 * | 1/2009 | Yamanami | G06F 1/1616 | 16/366 |
| 2009/0013500 A1 * | 1/2009 | Ueyama | G06F 1/1616 | 16/354 |
| 2009/0070961 A1 * | 3/2009 | Chung | E05D 3/122 | 16/354 |
| 2009/0241290 A1 * | 10/2009 | Jones | B41J 3/4071 | 16/291 |
| 2010/0024169 A1 * | 2/2010 | Self | A47K 3/36 | 16/354 |
| 2010/0232100 A1 | 9/2010 | Fukuma et al. | | |
| 2011/0000136 A1 * | 1/2011 | Brun | E05D 3/06 | 49/358 |
| 2011/0097138 A1 * | 4/2011 | Eikelenboom | B64G 1/222 | 403/81 |
| 2011/0157780 A1 * | 6/2011 | Wang | G06F 1/1681 | 361/679.01 |
| 2011/0265288 A1 * | 11/2011 | Chiang | G06F 1/1681 | 16/341 |
| 2011/0271486 A1 * | 11/2011 | Wang | G06F 1/1681 | 16/319 |
| 2011/0289726 A1 * | 12/2011 | Zhang | G06F 1/1681 | 16/250 |
| 2012/0002360 A1 | 1/2012 | Seo et al. | | |
| 2012/0044620 A1 | 2/2012 | Song et al. | | |
| 2012/0047685 A1 * | 3/2012 | Ma | G06F 1/1681 | 16/319 |
| 2012/0120618 A1 * | 5/2012 | Bohn | G06F 1/1681 | 361/749 |
| 2012/0162049 A1 | 6/2012 | Aoki et al. | | |
| 2012/0314399 A1 | 12/2012 | Bohn et al. | | |
| 2013/0010405 A1 | 1/2013 | Rothkopf et al. | | |
| 2013/0014346 A1 * | 1/2013 | Ahn | G06F 1/1681 | 16/354 |
| 2013/0016489 A1 * | 1/2013 | Yeh | G06F 1/1681 | 361/807 |
| 2013/0021762 A1 | 1/2013 | van Dijk et al. | | |
| 2013/0083466 A1 | 4/2013 | Becze et al. | | |
| 2013/0135809 A1 * | 5/2013 | Uchiyama | G06F 1/1681 | 361/679.09 |
| 2013/0139355 A1 * | 6/2013 | Lee | H04M 1/022 | 16/354 |
| 2013/0187525 A1 * | 7/2013 | Chuang | G06F 1/1681 | 312/326 |
| 2013/0216740 A1 * | 8/2013 | Russell-Clarke | B23K 26/38 | 428/33 |
| 2013/0219663 A1 * | 8/2013 | Cai | G06F 1/1681 | 16/371 |
| 2014/0174226 A1 * | 6/2014 | Hsu | E05D 3/122 | 74/98 |
| 2014/0174227 A1 * | 6/2014 | Hsu | E05D 3/14 | 74/98 |
| 2014/0196253 A1 * | 7/2014 | Song | G06F 1/1601 | 16/225 |
| 2014/0196254 A1 * | 7/2014 | Song | E05D 3/14 | 16/302 |
| 2014/0217875 A1 * | 8/2014 | Park | H05K 5/0226 | 312/326 |
| 2014/0245569 A1 * | 9/2014 | Cho | E05D 3/122 | 16/370 |
| 2015/0176317 A1 * | 6/2015 | Lee | E05D 3/06 | 16/251 |
| 2015/0361696 A1 | 12/2015 | Tazbaz | | |

FOREIGN PATENT DOCUMENTS

| | | |
|---|---|---|
| TW | M453755 U | 5/2013 |
| WO | 2014030912 A1 | 2/2014 |

OTHER PUBLICATIONS

Demand and Response filed Dec. 7, 2015 to the International Search Report and Written Opinion mailed Aug. 25, 2015 from PCT Patent Application No. PCT/US2015/034614, 18 pages.

Khalilbeigi, et al., "FoldMe: Interacting with Double-sided Foldable Displays", In Proceedings of 6th International Conference on Tangible, Embedded and Embodied Interaction, Feb. 19-22, 2012, 8 pages.

Non-Final Office Action mailed Nov. 20, 2015 from U.S. Appl. No. 14/303,510, 13 pages.

International Search Report & Written Opinion mailed Aug. 25, 2015 from PCT Patent Application No. PCT/US2015/034614, 14 pages.

Demand and Response filed Oct. 26, 2015 to the Written Opinion mailed Aug. 24, 2015 from PCT Patent Application No. PCT/US2015/034611, 15 pages.

Second Written Opinion mailed Feb. 17, 2016 from PCT Patent Application No. PCT/US2015/034611, 9 pages.

Response filed Feb. 22, 2016 to the Non-Final Office Action mailed Nov. 20, 2015 from U.S. Appl. No. 14/303,510, 10 pages.

(56) References Cited

OTHER PUBLICATIONS

Final Office Action mailed Apr. 21, 2016 from U.S. Appl. No. 14/303,510, 32 pages.
Second International Search Report & Written Opinion mailed May 18, 2016 from PCT Patent Application No. PCT/US2015/034614, 8 pages.
International Preliminary Report on Patentability mailed May 11, 2015 from PCT Patent Application No. PCT/US2015/034611, 10 pages.
Applicant Initiated Interview Summary mailed Jul. 29, 2016 from U.S. Appl. No. 14/303,510, 3 pages.
Response filed Jul. 20, 2016 to the Second International Search Report & Written Opinion mailed May 18, 2016 from PCT Patent Application No. PCT/US2015/034614, 9 pages.
Non-Final Office Action mailed Aug. 5, 2016 from U.S. Appl. No. 14/303,510, 26 pages.
After Final Consideration Pilot 2.0 Decision filed Aug. 5, 2016 from U.S. Appl. No. 14/303,510, 1 page.
Response and After Final Consideration Pilot Program Request filed Jul. 21, 2016 to the Final Office Action mailed Apr. 21, 2016 from U.S. Appl. No. 14/303,510, 9 pages.
Response filed Nov. 4, 2016 to the Non-Final Office Action mailed Aug. 5, 2016 from U.S. Appl. No. 14/303,510, 11 pages.
International Preliminary Report on Patentability mailed Sep. 16, 2016 from PCT Patent Application No. PCT/US2015/034614, 9 pages.
Communication pursuant to Rules 161(1) and 162 EPC mailed Feb. 10, 2017 from European Patent Application No. 15732112.6, 2 pages.
Final Office Action mailed Feb. 2, 2017 from U.S. Appl. No. 14/303,510, 43 pages.
Communication pursuant to Rules 161(1) and 162 EPC mailed Jan. 19, 2017 from European Patent Application No. 15730930.3, 2 pages.
Response filed Mar. 16, 2017 to the Final Office Action mailed Feb. 2, 2017 from U.S. Appl. No. 14/303,510, 9 pages.

* cited by examiner

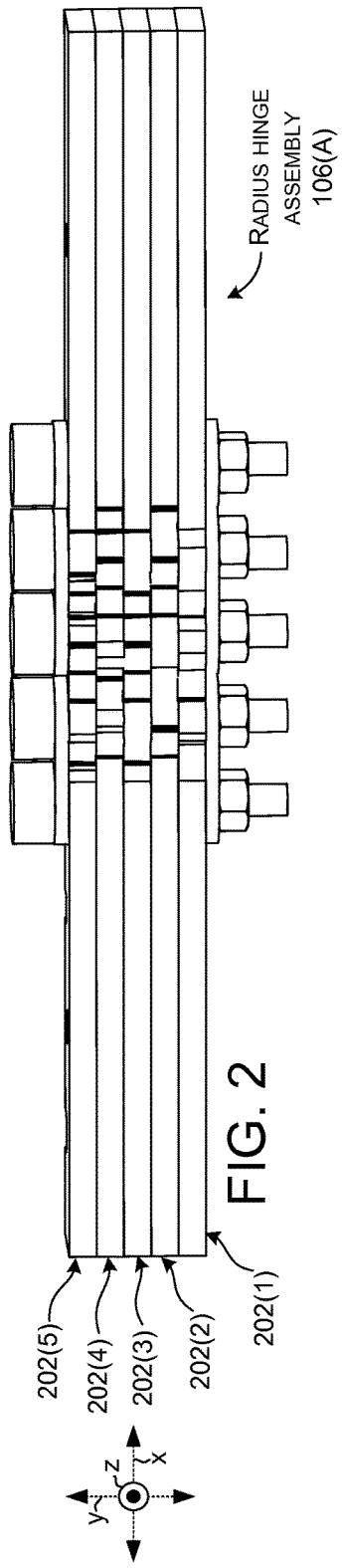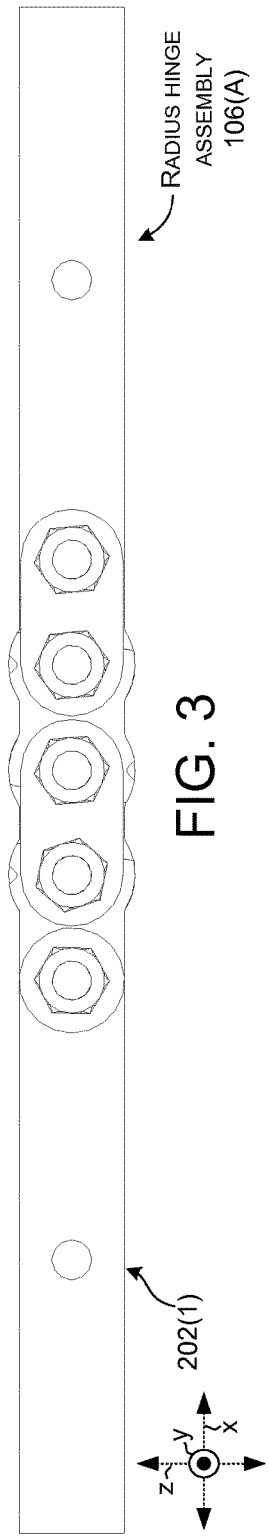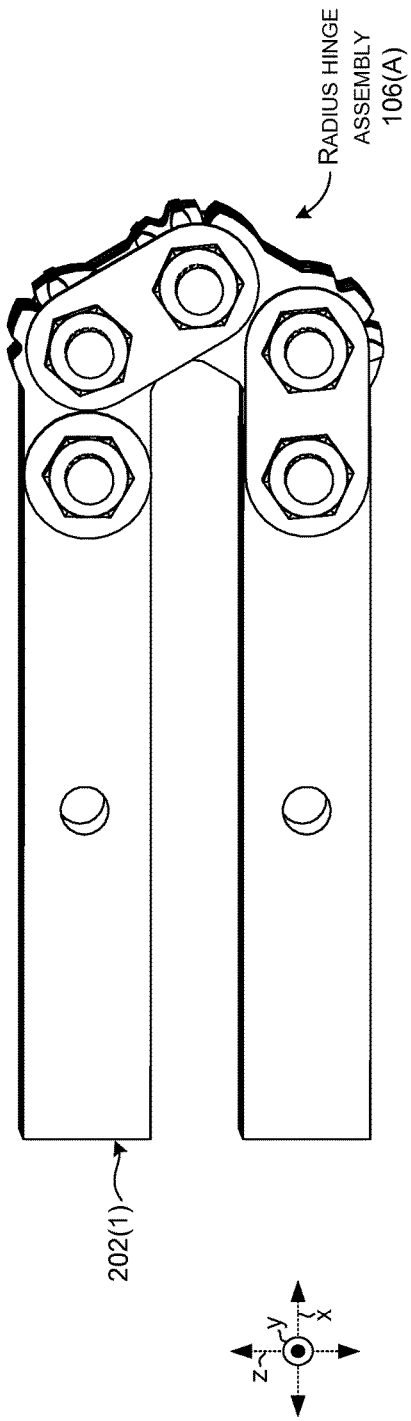

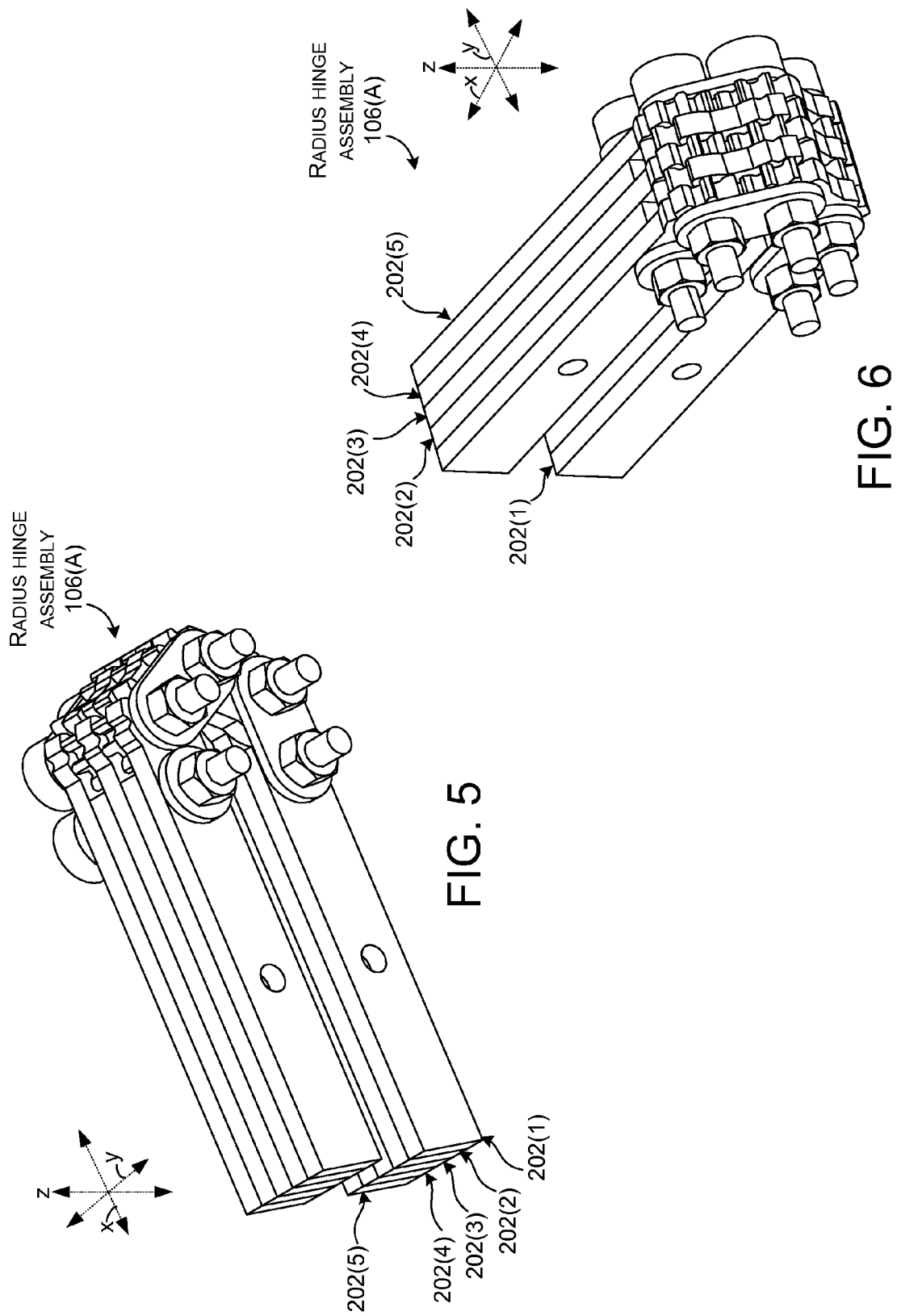

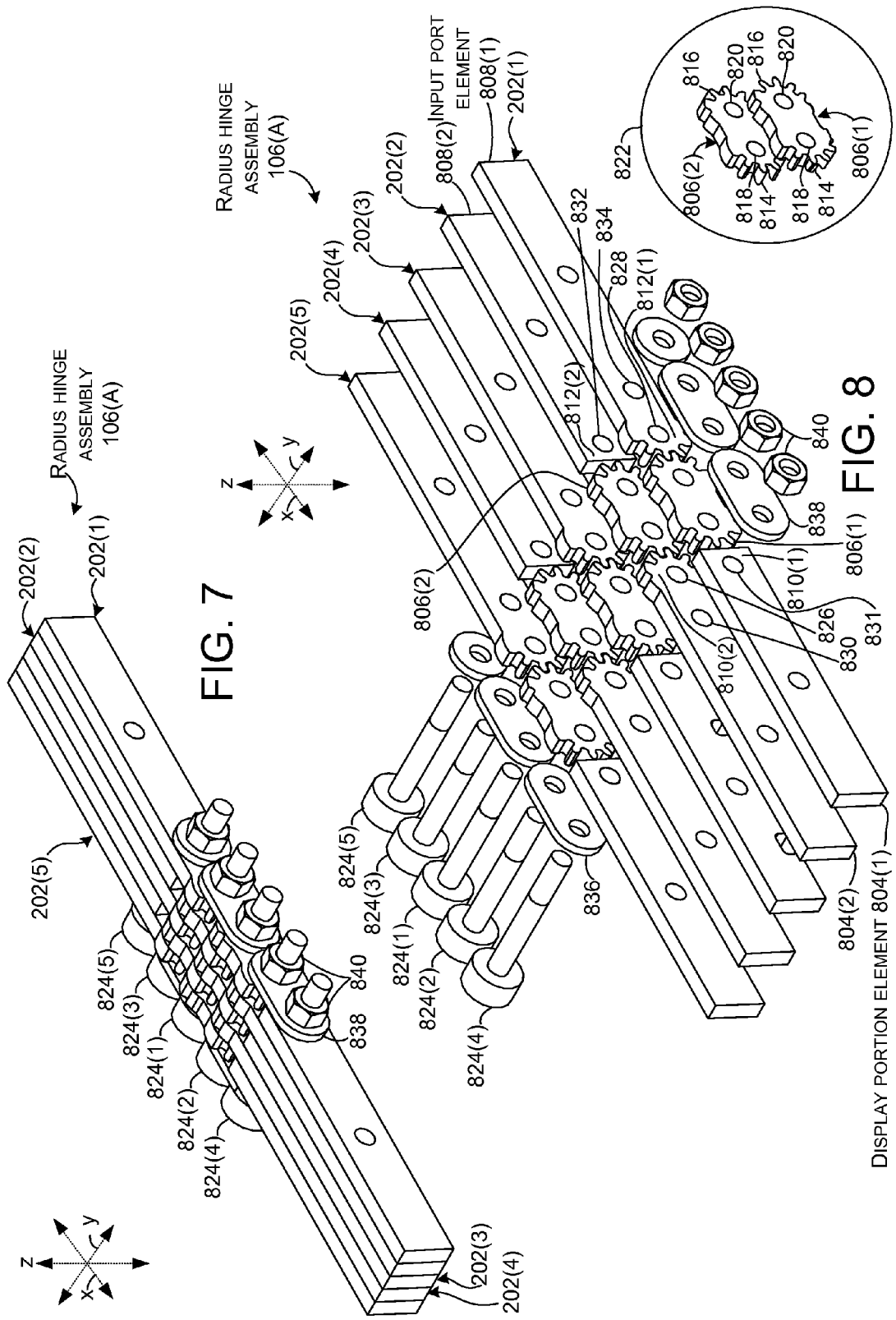

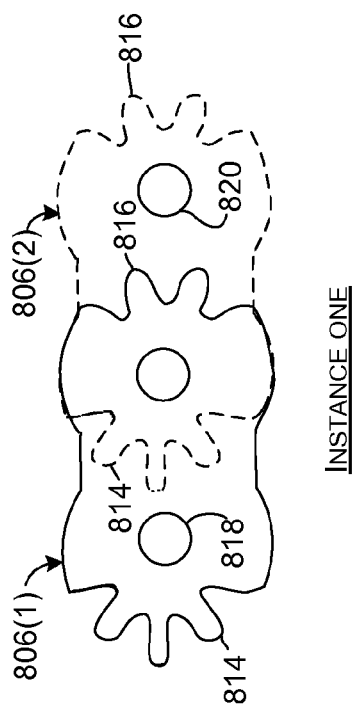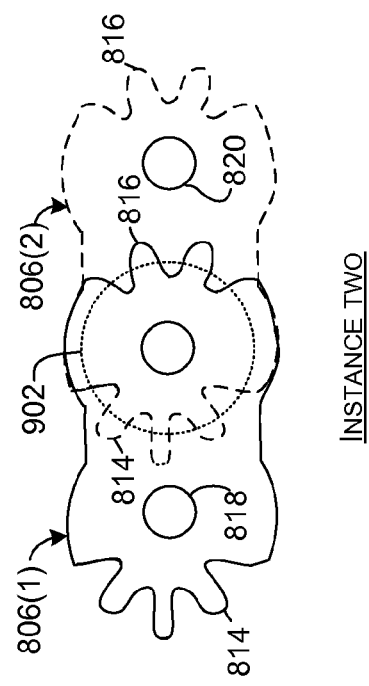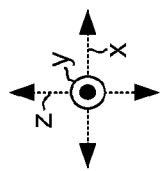
FIG. 9

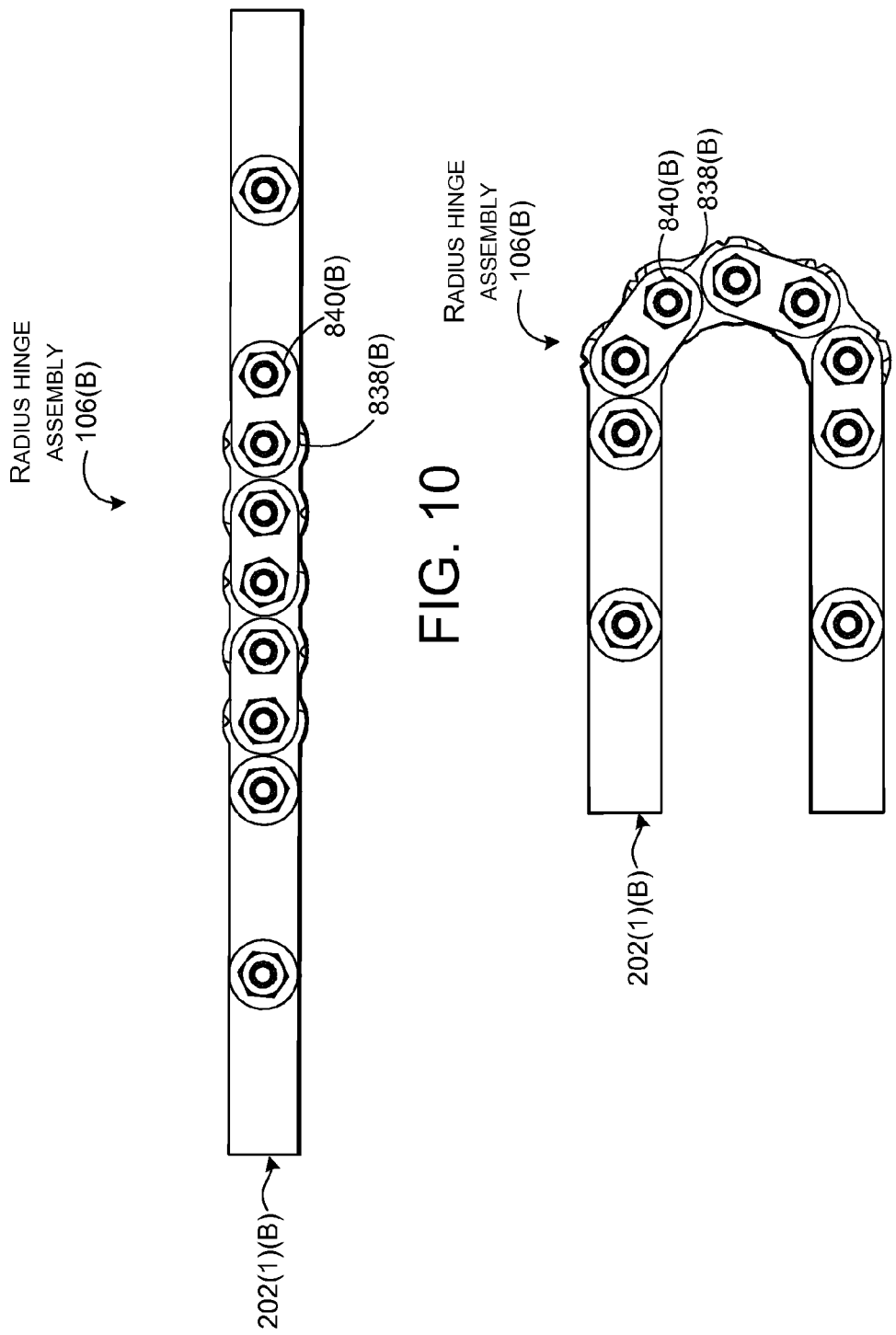

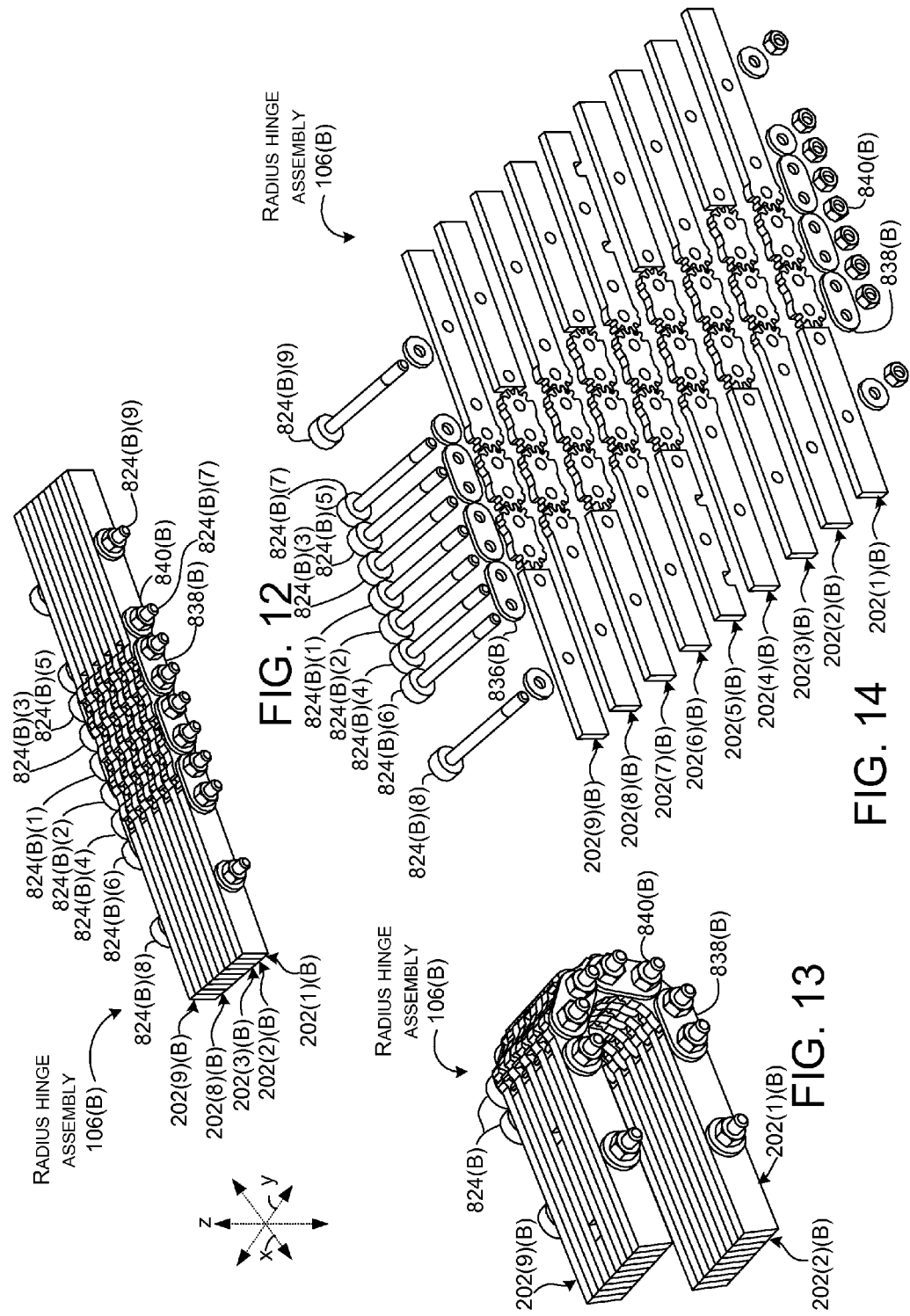

RADIUS HINGE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 2-4 are elevational views of a radius hinge example in accordance with some implementations of the present concepts.

FIGS. 5-7 are perspective views of a radius hinge example in accordance with some implementations of the present concepts.

FIG. 8 is an exploded perspective view that is similar to the perspective view of FIG. 7.

FIG. 9 is an elevational view of a portion of the radius hinge example shown in FIGS. 1-8.

FIGS. 10-11 are perspective views of a radius hinge example in accordance with some implementations of the present concepts.

FIGS. 12-13 are perspective views of a radius hinge example in accordance with some implementations of the present concepts.

FIG. 14 is an exploded perspective view that is similar to the perspective view of FIG. 12.

DESCRIPTION

The present concepts relate to a seamless radius hinge assembly that can offer up to full 360 degree rotation. The seamless radius hinge assembly can be employed to rotatably connect two portions of electronic or computing devices while protecting electronic components that span between the two portions. Traditional hinges tend to pivot around a single axis and can lead to pinching or other damage to the electronic components. In contrast, the seamless radius hinge assembly can offer (e.g., maintain) a minimum bend radius that can protect the electronics.

Figure 1:
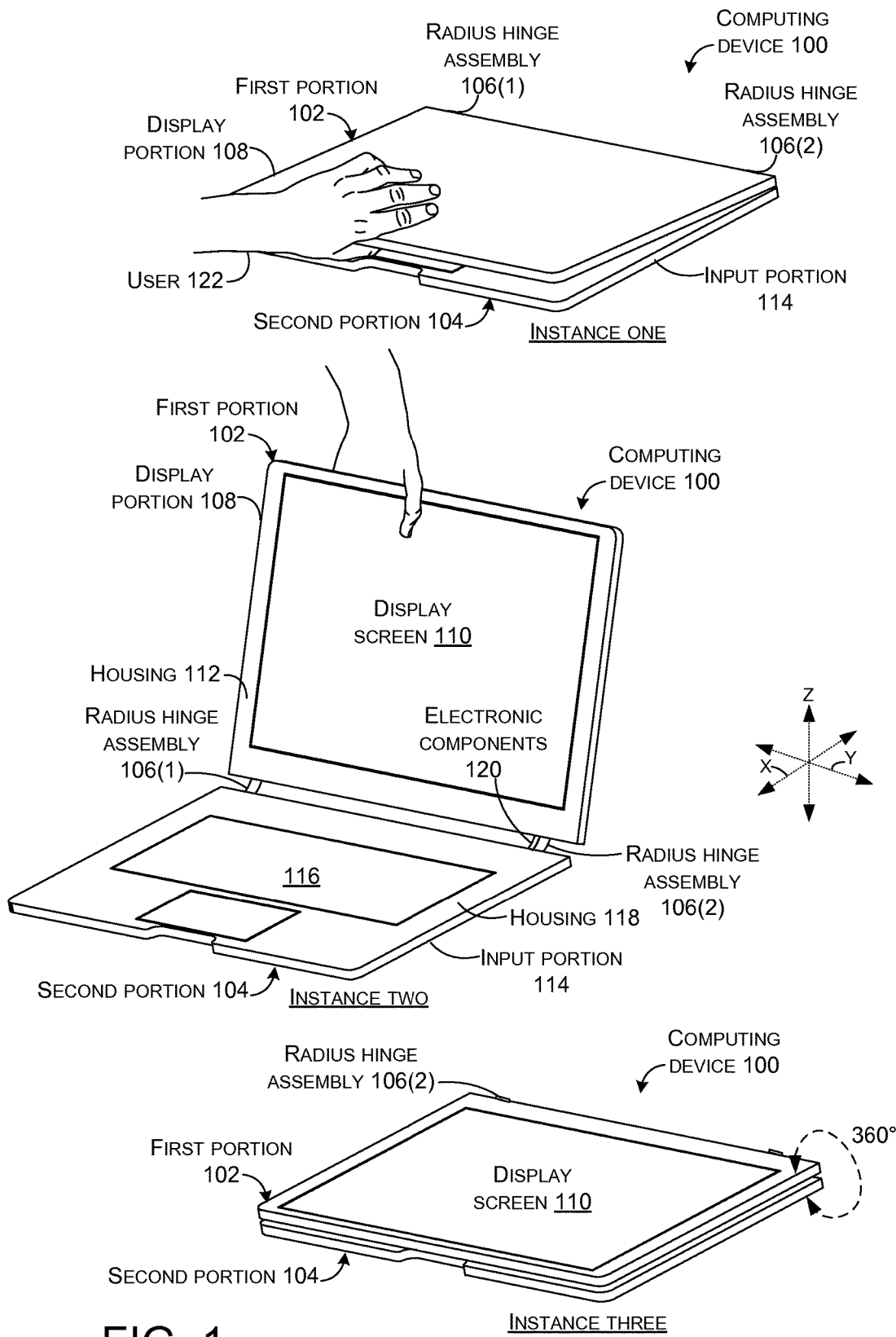
FIG. 1 is an example device that includes a radius hinge example in accordance with some implementations of the present concepts.

Introductory FIG. 1 shows an example of a computing device 100 that has first and second portions 102 and 104 that are rotatably secured together by a radius hinge assembly 106 (in this case, two radius hinge assemblies 106(1) and 106(2). In this instance, first portion 102 is manifest as a display portion 108 that includes a display screen 110 in a housing 112. Second portion 104 is manifest as an input portion 114 that includes an input device 116 and a housing 118. In this case the input device 116 is manifest as a keyboard and/or a track pad or touch pad. Other implementations can employ other input devices. For instance, the input device 116 could be manifest as a touch sensitive display screen. Electronic components 120 in the form of conductors can pass from the first portion 102 to the second portion 104 proximate to the radius hinge assembly 106.

The radius hinge assembly 106 can offer 360 degrees of rotation between the first portion 102 and the second portion 104 while protecting the electronic components 120 from damage associated with normal hinges. For example, instance one shows about five degrees of rotation between the first and second portions as a user 122 inserts his/her thumb between the portions. Instance two shows about 100 degrees of rotation and instance three shows about 360 degrees of rotation.

Further, the radius hinge assembly 106 can be thought of as a progressive hinge that can offer progressive resistance as the angle between the first portion 102 and the second portion 104 increases. For instance, in some implementations, at instance one the radius hinge assembly 106 can offer relatively low resistance to movement so the user 122 can tilt first portion 102 up and away from second portion 104 without holding the second portion 104 down with their second hand. Instance 2 shows the first portion 102 rotated approximately 100 degrees from second portion 104. At this angle the radius hinge assembly 106 can offer relatively greater resistance to movement and thus can hold the first portion stable for use. Instance three shows the second portion rotated all the way around to 360 degrees relative to the first portion (the computing device 100 has also been flipped so that the display screen 110 is facing up). In this configuration, the display screen can be used in a tablet-like manner.

The radius hinge assembly 106 can offer 360 degrees of rotation between the first and second portions while protecting the electronic components 120 from damage associated with normal hinges.

FIGS. 2-9 collectively show one implementation of radius hinge assembly 106 introduced above. This variation is distinguished via use of a suffix "A" (e.g., 106(A)). FIGS. 2-3 and 7-8 show the radius hinge assembly 106(A) in the 'open' position (e.g., 180 degrees). FIGS. 4-6 show the radius hinge assembly 106(A) in a 'closed' position (e.g., zero degrees). FIGS. 10-16 show another radius hinge implementation which is designated 106(B).

Radius hinge assembly 106(A) may include at least first and second adjacent offset stacks 202. The illustrated configuration includes five stacks 202(1)-202(5), however, more or less stacks may be employed. The number of stacks can be increased to add additional resistance to the radius hinge assembly as may be desired for a particular application. As may be most readily appreciated in the exploded view of FIG. 8, individual stacks may include a display portion element (e.g., display element) 804, a timed link element 806, and an input portion element (e.g., input element) 808. To improve readability of the drawing page only elements of the first two stacks 202(1) and 202(2) are designated. However, the stacks generally repeat themselves in an alternating manner. Thus, stack 202(3) and 202(5) are similar to stack 202(1) and stack 202(4) is similar to stack 202(2). Also, not every element is designated on every FIG. 2-9. In this implementation each stack includes a single timed link element 806. FIGS. 10-16 show another implementation where each stack includes multiple serially arranged timed link elements.

In the illustrated configuration of FIGS. 2-9, display portion element 804 can be secured to the display housing 112 (FIG. 1, Instance two). Similarly, the input portion element 808 can be secured to the input portion housing 118 (FIG. 1, Instance two). Relative to stacks 202(1), 202(3), and 202(5) a terminal end 810 of the display portion element 804(1) is not geared to engage the timed link element 806(1). In contrast, relative to stacks 202(2) and 202(4) the terminal ends 810 are geared to engage the timed link elements 806. Relative to stacks 202(1), 202(3), and 202(5) a terminal end 812 of the input portion element 808 is geared to engage the timed link elements 806. In contrast, relative to stacks 202(2) and 202(4) the terminal ends 812 are not geared to engage the timed link elements 806.

The timed link elements 806 can have generally opposing first and second ends 814 and 816 and a first hole 818 formed through the first end 814 and a second hole 820 formed through the second end 816. These elements are labeled without specificity in a callout 822 relative to FIG. 8 to avoid designator lines obscuring the main drawings. Note that in the illustrated configuration, individual timed link elements are geared on both ends. This configuration can allow radius hinge assemblies 106(A) to be constructed with fewer different types of elements. However, note that the first end 814 of timed link element 806(1) does not engage terminal end 810 of display portion element 804(1) and thus the gear teeth are not utilized and thus could be eliminated. Similarly, the second end 816 of timed link element 806(2) could also eliminate the gear teeth because they do not engage terminal end 812(2) of input portion element 808(2).

Radius hinge assembly 106(A) may include a generally elongate axis pin 824(1) that passes through the second hole 820 of the timed link element 806(1) of the first stack 202(1). The axis pin 824(1) can also pass through the first hole 818 of the timed link element 806(2) of the second stack 202(2) to secure the second stack 202(2) in an offset manner relative to the first stack 202(1). In this case, the offset manner can be defined by a pitch diameter of the timed link elements. FIG. 9 shows timed link element 806(1) and timed link element 806(2) at instance one. Timed link element 806(2) is shown in dashed lines since part of timed link element 806(2) is behind timed link element 806(1). Instance two shows the addition of pitch diameter 902 as defined by the second end 816 of the first timed link element 806(1) and a first end 814 of the second timed link element 806(2).

Returning to FIG. 8, the radius hinge assembly 106(A) may include a second axis pin 824(2) and a third axis pin 824(3) that are generally parallel to the first axis pin 824(1). The second axis pin 824(2) can pass through a hole 826 in the display element 804(2) of the second stack 202(2) and the hole 818 in the first end of the timed link element 806(1) of the first stack 202(1). The third axis pin 824(3) can pass through the hole 820 in the second end 816 of the timed link element 806(2) of the second stack 202(2) and a hole 828 in the input portion element 808(1) of the first stack 202(1).

In the present configuration, the second axis pin 824(2) and the third axis pin 824(3) are on opposite sides of the (first) axis pin 824(1). This configuration may include a fourth axis pin 824(4) that is adjacent to the second axis pin 824(2) and distal to the axis pin 824(1) and a fifth axis pin 824(5) that is adjacent to the third access pin 824(3) and distal to the axis pin 824(1). The fourth axis pin 824(4) can pass through a second hole 830 in the display element 804(2) of the second stack 202(2) and a hole 831 in the display element 804(1) of the first stack 202(1). The fifth axis pin 824(5) can pass through a hole 832 in the input portion element 808(2) of the second stack 202(2) and a second hole 834 of the input portion element 808(1) of the first stack 202(1).

In this implementation, the axis pins 824 can be manifest as threaded bolts. The bolts can pass through link covers 836 (not all of which are designated with specificity) through the stacks 202(1)-202(5) and through another set of link covers 838 and a set of threaded nuts 840. In the present configuration the second axis pin 824(2) and the fourth axis pin 824(4) share common link covers on each side of the first and fifth stacks and the axis pin 824(1) and the third axis pin 824(3) share other common link covers on each side of the first and fifth stacks. The threaded bolts, link covers, and the nuts 840 may provide a compressive force to squeeze the stacks against one another to create friction between the adjacent elements. In some implementations, an axial load may be applied between elements through the use of a spring washer between the nuts 840 and the link covers 838 to create and maintain the desired friction interface between the stacks. The spring washer can help to maintain the axial load even as elements wear. At some point if the spring washer cannot maintain the load, these implementations can be readily adjusted by tightening the bolt/nuts to increase the friction.

The illustrated configuration may be viewed as employing axial friction to control hinge stiffness. Other types of axial friction configurations are contemplated. An alternative configuration can utilize oversize axis pins 824 (relative to the holes). The oversize axis pins can be force fitted through the holes in the stacks 202 to create a friction fit between the axis pin and the elements defining the holes. This configuration may be viewed as employing radial friction to control hinge stiffness and other configurations are contemplated.

In this implementation relative to the first stack 202(1), the first end 814 of the timed link element 806(1) does not engage the display element 804(1). The second end 816 can engage the input portion element 808(1) in a no-slip one-to-one rotational engagement. Relative to the second stack 202(2), the first end 814 of the timed link element 806(2) can engage the display portion element 804(2) in a no-slip one-to-one rotational engagement and the second end 816 does not engage the input portion element 808(2). In this case, the no-slip one-to-one rotational engagement is accomplished by intermeshing gears that cause the radius hinge assembly to rotate around axis pins 824(1), 824(2), and 824(3) simultaneously. Other implementations can utilize other gear profiles and/or types of gears and/or can utilize non-geared solutions such as smooth but high friction radial surfaces. Characterized from one perspective, the radius hinge implementation illustrated in FIGS. 2-9 can simultaneously pivot around three axes (e.g., axis pins 824(1), 824(2), and 824(3)). The discussion that follows describes a radius hinge implementation that can simultaneously pivot around five axes. Given equivalent size elements, increasing the number of axes can increase the hinge radius. Another way of increasing the hinge radius can entail increasing the pitch diameter while maintaining the same number of axes.

FIGS. 10-16 show another radius hinge assembly 106(B) that is similar to radius hinge assembly 106(A) described above relative to FIGS. 2-9. As such, not all elements are re-introduced here for sake of brevity. The suffix "(B)" is utilized to distinguish elements of radius hinge assembly 106(B) from the implementations described above. In this case, FIG. 14 is an exploded perspective view that is similar to FIG. 8 and which lends itself to visualization of the elements. This implementation includes nine stacks 202(1)(B)-202(9)(B). Other numbers of stacks are contemplated. Further, the stacks are secured by axis pins 824(B)(1)-824(B)(9), link covers 836(B) and 838(B), and nuts 840(B). This implementation employs more axis pins, link covers, and nuts than the implementation described above relative to FIGS. 2-9. The functionality, however, remains similar. As such, these elements are not discussed in detail relative to FIGS. 10-16. Due to the amount of elements in this implementation and the constraints of the drawing page, example stacks 202(1)(B) and 202(2)(B) are shown in isolation relative to FIG. 15 so that more room is available on the drawing page for labeling specific elements.

Figure 15:
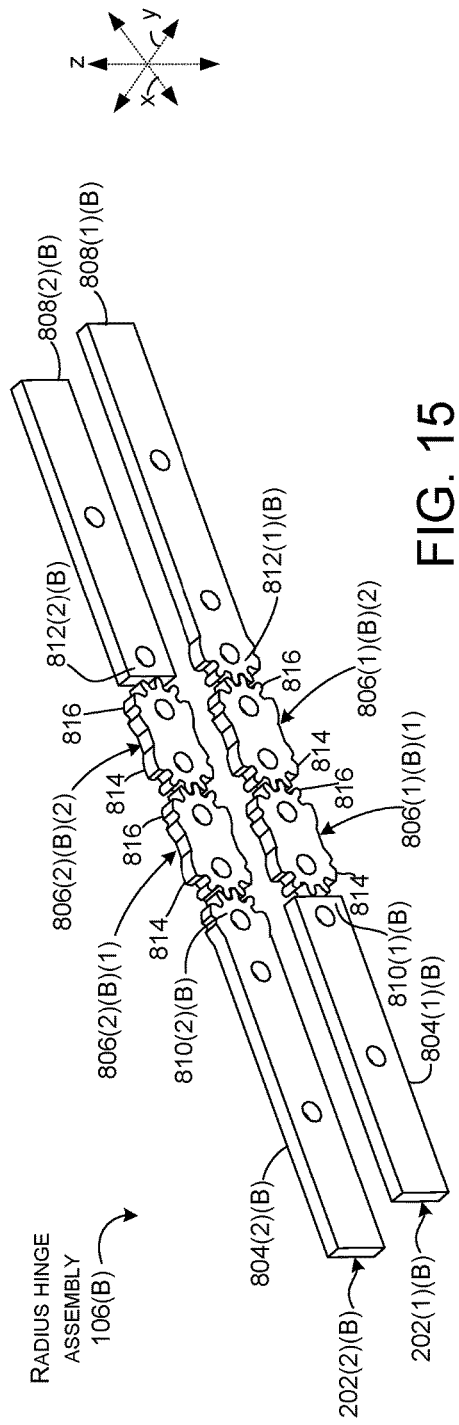
FIG. 15 is a perspective view of a portion of the radius hinge example shown in FIG. 14.

As can be appreciated from FIG. 15, the timed link element 806 of an individual stack 202 comprises first and second timed link elements 806. For instance, stack 202(1)(B) includes first timed link element 806(1)(B)(1) and 806(1)(B)(2) and stack 202(2)(B) includes first timed link element 806(2)(B)(1) and 806(2)(B)(2). Relative to the first stack 202(1)(B), the first end 814 of the first timed link element 806(1)(B)(1) does not engage the terminal end 810(1)(B) of display portion element 804(1)(B). The second end 816 can engage a first end 814 of the second timed link element 806(1)(B)(2). A second end 816 of the second timed link element 806(1)(B)(2) can engage the terminal end 812(1)(B) of the input portion element 808(1)(B). Relative to the second stack 202(B)(2), the first end 814 of the first timed link element 806(2)(B)(1) can engage the display element 804(2)(B) in a no-slip one-to-one rotational engagement. The second end 816 of the first timed link element 806(2)(B)(1) can engage a first end 814 of the second timed link element 806(2)(B)(2) in a no-slip one-to-one rotational engagement and a second end 816 of the second timed link element 806(2)(B)(2) does not engage the terminal end 812(2)(B) of the input portion element 808(2)(B). Each of these engagements can provide a no-slip one-to-one rotational engagement such that the radius hinge assembly functions as a single unit that rotates around multiple axes simultaneously. For instance, in the example illustrated in FIG. 14, the multiple axes of rotation are defined by axis pins 824(B)(1)-824(B)(5) whereas in the implementation of FIG. 8, the multiple axes of rotation are defined by axis pins 824(1)-824(3).

Figure 16:
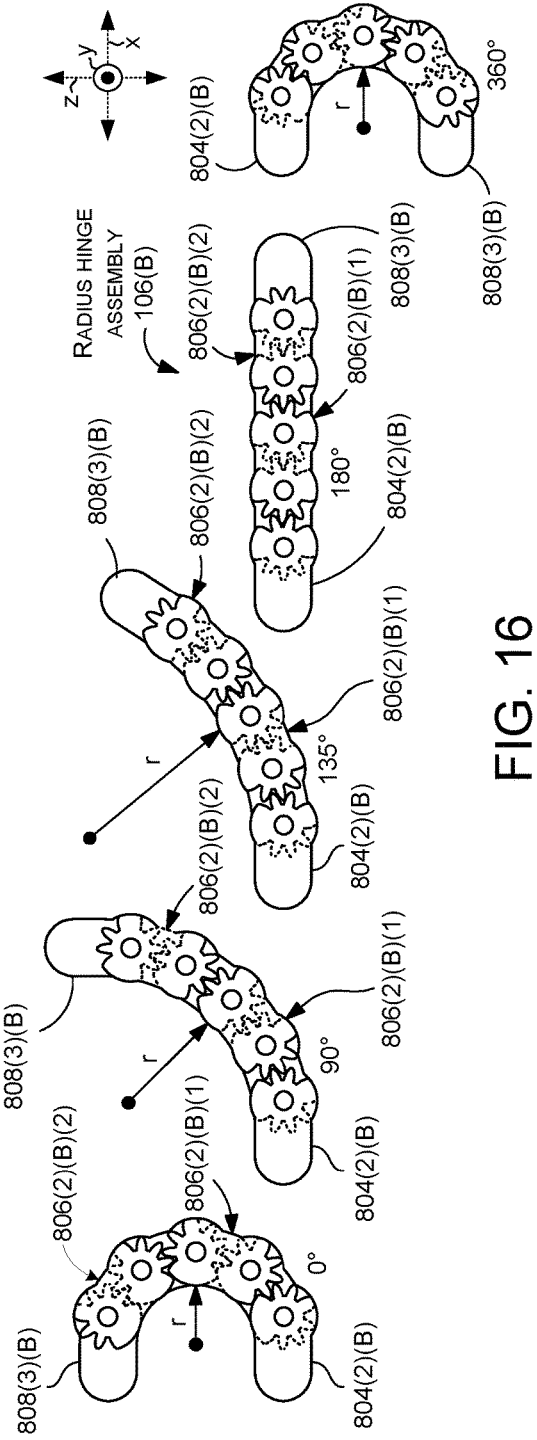
FIG. 16 is an elevational view of a portion of the radius hinge example shown in FIGS. 10-15.

FIG. 16 shows the input portion element 808(1)(B), timed link elements 806(1)(B)(1) and 806(1)(B)(2) and display portion element 804(1)(B) of radius hinge assembly 106(B). FIG. 16 shows how the radius hinge assembly 106(B) can simultaneously rotate around multiple axes (represented by the holes which are shown but not designated to avoid clutter on the drawing page, but which are designated relative to FIG. 8 and which are configured to receive the axis pins). FIG. 16 shows the radius hinge assembly 106(B) at zero degrees, 90 degrees, 135 degrees, 180 degrees and 360 degrees. Further, the radius hinge assembly can achieve this rotation while maintaining a minimum bend radius r. In this case, the bend radius is at its lowest value at 0 degrees and 360 degrees with higher values for the intervening values. Note that while the radius hinge assembly can be capable of full 360 degree rotation (or even a few degrees more (e.g., about 365 degrees)), mechanical stops can be included that limit the rotation at a specific value such as 135 degrees or 180 degrees, for example. Given equivalent size elements, the minimum bend radius can be enlarged by adding more timed link elements 806. For example, compare FIG. 4 which employs a single timed link element per stack to FIG. 11 which employs two link elements per stack.

In summary, the present radius hinge assembly implementations can offer a seamless hinge that allows 360 degree articulation. This design can allow for a device screen to be articulated relative to the base 360 degrees without the need to index at discrete positions through the use of timed gears and friction to hold a desired position. The radius hinge assembly implementations can be embedded in an elastomer or fabric as to conceal the mechanism. 360 degree articulation allows the device to be configured in laptop, stand, tent, and/or tablet modes.

The radius hinge assembly can be thought of as a friction hinge with timed gearing to control curvature of the hinge through a full range of articulation. The gearing can couple the individual timed link elements together to spread friction requirements over all of the friction elements. The elements can provide triple duty as gears, linkages, and friction elements.

Individual elements of the radius hinge assembly can be made from various materials, such as sheet metals, die cast metals, and/or molded plastics, among others, or any combination of these materials. Stacks can be added to create higher friction for larger loads.

In summary, the above discussion relates to devices, such as computing devices that have hinged portions. One example can include a display portion that includes a display screen and an input portion that includes an input device. This example can also include a radius hinge assembly rotatably securing the first and second portions. The radius hinge assembly can be configured to provide a curvilinear articulation that can allow 360 degrees of relative rotation between the first and second portions.

Another example can include a first portion and a second portion. Each of the first and second portions can include electronic components that are interconnected by conductors. This example can also include a radius hinge assembly rotatably securing the first and second portions. The radius hinge assembly can include at least first and second offset adjacent stacks. The at least first and second offset adjacent stacks can collectively control rotation of the first and second portions relative to one another while preserving a minimum bend radius for the conductors between the first portion and the second portion.

Still another example can include a display portion that includes a display screen and an input portion that includes an input device. This example can also include a hinge assembly rotatably securing the display and input portions. The hinge assembly can include at least first and second adjacent offset stacks. Individual stacks can include a display portion element, a timed link element, and an input portion element. The timed link element can have generally opposing first and second ends and a first hole formed through the first end and a second hole formed through the second end. An axis pin can pass through the second hole of the timed link element of the first stack and the first hole of the timed link element of the second stack that can secure the second stack in an offset manner relative to the first stack. The offset manner can be defined by a pitch diameter of the second end of the timed link element of the first stack and a first end of the timed link element of the second stack.

Further Examples

An example computing device can include a display portion that includes a display screen and an input portion that includes an input device and a hinge assembly rotatably securing the display and input portions. The hinge assembly can include at least first and second adjacent offset stacks, individual stacks include a display portion element, a timed link element, and an input portion element. The timed link element having generally opposing first and second ends and a first hole formed through the first end and a second hole formed through the second end. The hinge assembly can also include an axis pin passing through the second hole of the timed link element of the first stack and the first hole of the timed link element of the second stack that secures the second stack in an offset manner relative to the first stack. The offset manner being defined by a pitch diameter of the second end of the timed link element of the first stack and a first end of the timed link element of the second stack.

The computing device of the above and/or below examples, wherein the input portion includes a housing, and wherein the input portion element is secured to the housing.

The computing device of the above and/or below examples, wherein the display portion includes a housing, and wherein the display portion element is secured to the housing.

The computing device of the above and/or below examples, wherein the hinge assembly is configured to allow 360 degrees of rotation of the display portion and the input portion relative to one another.

The computing device of the above and/or below examples, wherein the hinge assembly is a progressive hinge that provides less resistance to rotation when the display portion and the input portion define a relatively small angle therebetween and progressively more resistance as the angle becomes larger.

The computing device of the above and/or below examples, wherein each stack includes a single timed link element or wherein each stack includes multiple serially arranged timed link elements.

The computing device of the above and/or below examples, wherein each stack includes a single timed link element and wherein each end of the single timed link element is geared or wherein only one of the first or the second ends is geared.

The computing device of the above and/or below examples, wherein relative to the first stack, the first end of the timed link element does not engage the display portion element and the second end engages the input portion element in a no-slip one-to-one rotational engagement and relative to the second stack the first end of the timed link element engages the display portion element in a no-slip one-to-one rotational engagement and the second end does not engage the input portion element.

The computing device of the above and/or below examples, wherein the axis pin includes a first axis pin and further includes a second axis pin that passes through a hole in the display portion element of the second stack and the hole in the first end of the timed link element of the first stack and a third axis pin that passes through the hole in the second end of the timed link element of the second stack and a hole in the input portion element of the first stack.

The computing device of the above and/or below examples, wherein the first axis pin, the second axis pin, and the third axis pin are oversized compared to the holes in the first and second stacks to create a friction fit.

The computing device of the above and/or below examples, wherein the first axis pin, the second axis pin and the third axis pin compress the first and second stacks against one another.

The computing device of the above and/or below examples, wherein the first axis pin, the second axis pin and the third axis pin include threaded bolts that receive threaded nuts that can be tightened to compress the first and second stacks against one another.

The computing device of the above and/or below examples, wherein the second axis pin and the third axis pin are on opposite sides of the first axis pin and including a fourth axis pin that is adjacent to the second axis pin and distal to the first axis pin and a fifth axis pin that is adjacent to the third axis pin and distal to the first axis pin. The fourth axis pin passes through a second hole in the display portion element of the second stack and a hole in the display portion element of the first stack and the fifth axis pin passes through a hole in the input portion element of the second stack and a second hole of the input portion element of the first stack.

The second and fourth axis pins share common link covers on each side of the first and second stacks and the first axis pin and the third axis pin share other common link covers on each side of the first and second stacks.

The computing device of the above and/or below examples, wherein the timed link element of an individual stack includes first and second timed link elements and relative to the first stack. The first end of the first timed link element does not engage the display portion element and the second end engages a first end of the second timed link element in a no-slip one-to-one rotational engagement and a second end of the second timed link element engages the input portion element in a no-slip one-to-one rotational engagement and relative to the second stack the first end of the first timed link element engages the display portion element in a no-slip one-to-one rotational engagement and the second end of the first timed link element engages a first end of the second timed link in a no-slip one-to-one rotational engagement and a second end of the second timed link element does not engage the input portion element.

An example computing device including a display portion that includes a display screen and an input portion that includes an input device and a radius hinge assembly rotatably securing the display and input portions and configured to provide a curvilinear articulation that allow 360 degrees of relative rotation between the display and input portions.

The computing device of the above and/or below examples, wherein the radius hinge assembly rotates around a set of elongate parallel axis pins and the curvilinear articulation is viewed transverse to a long axis of the axis pins.

The computing device of the above and/or below examples, wherein the radius hinge assembly includes timed gearing to control curvature of the curvilinear articulation for the 360 degrees of relative rotation.

The computing device of the above and/or below examples, wherein the input device includes a touch pad, a keyboard, and/or a touch sensitive display screen.

An example computing device that include a first portion that includes an electronic component and is electrically connected by conductors to a second portion that includes a second electronic component and a radius hinge assembly rotatably securing the first and second portions. The radius hinge assembly including at least first and second offset adjacent stacks that collectively control rotation of the first and second portions relative to one another while preserving a minimum bend radius for the conductors between the first portion and the second portion.

The computing device of the above and/or below examples, wherein the hinge assembly allows the rotation from 0 degrees to 360 degrees and wherein the minimum bend radius occurs at 0 degrees and 360 degrees and a bend radius increases at intermediate degree values from the minimum bend radius.

Example Methods

Various methods of manufacture, assembly, and use for radius hinge assemblies are contemplated beyond those shown above relative to FIGS. 1-16.

CONCLUSION

Although techniques, methods, devices, systems, etc., pertaining to radius hinge assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising:
a display portion that includes a display screen and an input portion that includes an input device; and,
a hinge assembly rotatably securing the display and input portions, the hinge assembly including:
at least first and second adjacent offset stacks, the first stack comprising a first display portion element, a first timed link element, and a first input portion element, the second stack comprising a second display portion element, a second timed link element, and a second input portion element, the first and second timed link elements having generally opposing first and second ends and a first hole formed through the first end and a second hole formed through the second end, and,
a first axis pin passing through the second hole of the first timed link element of the first stack and the first hole of the second timed link element of the second stack and a second axis pin that passes through the first hole of the first timed link element of the first stack and the second display portion element of the second stack and a third axis pin that passes through the first input portion element of the first stack and the second hole of the second timed link element of the second stack, such that the first, second, and third axis pins secure the second stack in an offset manner relative to the first stack.

2. The computing device of claim 1, wherein the input portion comprises a housing, and wherein the first input portion element is secured to the housing.

3. The computing device of claim 1, wherein the display portion comprises a housing, and wherein the first display portion element is secured to the housing.

4. The computing device of claim 1, wherein the hinge assembly is configured to allow 360 degrees of rotation of the display portion and the input portion relative to one another.

5. The computing device of claim 1, wherein each stack includes a single timed link element and wherein each end of the single timed link element is geared.

6. The computing device of claim 1, wherein each stack includes a single timed link element and wherein only one of the first or the second ends is geared.

7. The computing device of claim 1, wherein relative to the first stack, the first end of the first timed link element does not engage the first display portion element and the second end of the first timed link element engages the first input portion element in a no-slip one-to-one rotational engagement and relative to the second stack the first end of the second timed link element engages the second display portion element in a no-slip one-to-one rotational engagement and the second end of the second timed link element does not engage the second input portion element.

8. The computing device of claim 1, wherein the offset manner is defined by a pitch diameter of the second end of the first timed link element of the first stack and the first end of the second timed link element of the second stack.

9. The computing device of claim 1, wherein, the first axis pin, the second axis pin, and the third axis pin are oversized compared to the holes in the first and second stacks to create a friction fit.

10. The computing device of claim 1, wherein the first axis pin, the second axis pin, and the third axis pin compress the first and second stacks against one another.

11. The computing device of claim 10, wherein the first axis pin, the second axis pin, and the third axis pin comprise threaded bolts that receive threaded nuts that can be tightened to compress the first and second stacks against one another.

12. The computing device of claim 1, wherein the second axis pin and the third axis pin are on opposite sides of the first axis pin and further comprising a fourth axis pin that is adjacent to the second axis pin and distal to the first axis pin and a fifth axis pin that is adjacent to the third axis pin and distal to the first axis pin and wherein the fourth axis pin passes through a second hole in the second display portion element of the second stack and a hole in the first display portion element of the first stack and the fifth axis pin passes through a hole in the second input portion element of the second stack and a second hole of the first input portion element of the first stack and wherein the second and fourth axis pins share common link covers on each side of the first and second stacks and the first and third axis pins share other common link covers on each side of the first and second stacks.

13. A computing device, comprising:
a display portion that includes a display screen and an input portion that includes an input device; and,
a radius hinge assembly rotatably securing the display and input portions and configured to facilitate a curvilinear articulation that allows 360 degrees of relative rotation between the display and input portions, the radius hinge assembly including:
at least first and second adjacent offset stacks, the first stack comprising a first display portion element directly engaging the display portion and a first input portion element directly engaging the input portion, the first display portion element positioned next to a first timed link element of the first stack, the second stack comprising a second display portion element directly engaging the display portion and a second input portion element directly engaging the input portion, the second display portion element positioned next to a second timed link element of the second stack, the first stack being offset from the second stack such that an individual axis of the curvilinear articulation that allows the 360 degrees of relative rotation passes through the first timed link element and does not pass through the second timed link element.

14. The computing device of claim 13, wherein the radius hinge assembly rotates around a set of elongate parallel axis pins and the curvilinear articulation forms a curve of the radius hinge assembly, the curve viewed in a plane that is transverse to long axes of the axis pins.

15. The computing device of claim 13, wherein the radius hinge assembly comprises timed gearing to control curvature of the curvilinear articulation for the 360 degrees of relative rotation.

16. The computing device of claim 13, wherein the input device comprises a touch pad, a keyboard, and/or a touch sensitive display screen.

17. The computing device of claim 13, wherein the first and second adjacent offset stacks each include a single timed link element or wherein the first and second adjacent offset stacks each include multiple serially arranged timed link elements.

18. The computing device of claim 13, wherein the first and second adjacent offset stacks each include multiple timed link elements and a first end of the first timed link element of the first stack does not engage the first display portion element of the first stack and a second end of the first timed link element engages a first end of another timed link element of the first stack in a no-slip one-to-one rotational engagement and a second end of the another timed link element of the first stack engages the first input portion element of the first stack in a no-sop one-to-one rotational engagement and a first end of the second timed link element of the second stack engages the second display portion element of the second stack in a no-slip one-to-one rotational engagement and a second end of the second timed link element engages a first end of another timed link element of the second stack in a no-slip one-to-one rotational engagement and a second end of the another timed link element of the second stack does not engage the second input portion element of the second stack.

19. A computing device, comprising:
a first portion that includes an electronic component and is electrically connected by conductors to a second portion that includes a second electronic component; and,
a radius hinge assembly rotatably securing the first and second portions, the radius hinge assembly including at least first, second, and third offset stacks that collectively control rotation of the first and second portions relative to one another while preserving a minimum bend radius for the conductors between the first portion and the second portion, the first, second, and third offset stacks having a same number of parts including respective first portion elements directly engaging the first portion, respective second portion elements directly engaging the second portion, and timed link elements, the second stack being offset from the first and third stacks such that an axis of the rotation of the first and second portions passes through an individual first portion element of the first stack, an individual timed link element of the second stack, and an individual first portion element of the third stack.

20. The computing device of claim 19, wherein the radius hinge assembly allows the rotation from 0 degrees to 360 degrees and wherein the minimum bend radius occurs at 0 degrees and 360 degrees and a bend radius increases at intermediate degree values from the minimum bend radius.

* * * * *